United States Patent
Cherian et al.

(10) Patent No.: US 12,404,433 B2
(45) Date of Patent: Sep. 2, 2025

(54) NON-SWELLING HOT MELT ADHESIVE

(71) Applicant: Avery Dennison Corporation, Glendale, CA (US)

(72) Inventors: Anna Cherian, Wassenaar (NL); Jarkko T. Pitko, Wassenaar (NL)

(73) Assignee: Avery Dennison Corporation, Mentor, OH (US)

( * ) Notice: Subject to any disclaimer, the term of this patent is extended or adjusted under 35 U.S.C. 154(b) by 1335 days.

(21) Appl. No.: 17/049,325

(22) PCT Filed: Apr. 26, 2019

(86) PCT No.: PCT/US2019/029273
§ 371 (c)(1),
(2) Date: Oct. 20, 2020

(87) PCT Pub. No.: WO2019/210120
PCT Pub. Date: Oct. 31, 2019

(65) Prior Publication Data
US 2021/0238457 A1      Aug. 5, 2021

Related U.S. Application Data

(60) Provisional application No. 62/663,288, filed on Apr. 27, 2018.

(51) Int. Cl.
| | | |
|---|---|---|
| C09J 153/02 | (2006.01) | |
| C09J 7/24 | (2018.01) | |
| C09J 7/38 | (2018.01) | |
| C09J 123/22 | (2006.01) | |
| C09J 147/00 | (2006.01) | |
| G09F 3/02 | (2006.01) | |

(52) U.S. Cl.
CPC ............ *C09J 153/02* (2013.01); *C09J 7/243* (2018.01); *C09J 7/387* (2018.01); *C09J 123/22* (2013.01); *C09J 147/00* (2013.01); *G09F 3/02* (2013.01); *C09J 2423/046* (2013.01); *C09J 2453/00* (2013.01); *G09F 2003/023* (2013.01); *Y10T 428/1476* (2015.01); *Y10T 428/2883* (2015.01)

(58) Field of Classification Search
CPC .. C09J 109/06; C09J 125/10; C08K 2003/265
See application file for complete search history.

(56) References Cited

U.S. PATENT DOCUMENTS

| | | |
|---|---|---|
| 5,013,785 A | 5/1991 | Mizui |
| 5,869,562 A | 2/1999 | Lindquist et al. |
| 5,900,465 A | 5/1999 | Nishikawa et al. |
| 6,646,019 B2 | 11/2003 | Perez et al. |
| 7,771,807 B2 | 8/2010 | Hubbard |
| 7,882,673 B1 | 2/2011 | Hohmann, Jr. |
| 8,378,015 B2 | 2/2013 | He et al. |
| 9,242,021 B2 | 1/2016 | Singh et al. |
| 2002/0173582 A1 | 11/2002 | Schmidt |
| 2004/0159969 A1 | 8/2004 | Truog et al. |
| 2004/0243042 A1 | 12/2004 | Lipman |
| 2008/0171199 A1 | 7/2008 | Song et al. |
| 2008/0286571 A1 | 11/2008 | Ichimura et al. |
| 2010/0139707 A1 | 6/2010 | Boonstra et al. |
| 2010/0224312 A1 | 9/2010 | Tsubaki et al. |
| 2011/0033662 A1 | 2/2011 | Ikishima et al. |
| 2011/0076430 A1 | 3/2011 | Shigematsu |
| 2011/0104487 A1 | 5/2011 | Schroeyers et al. |
| 2013/0037989 A1 | 2/2013 | Wiercinski et al. |
| 2013/0299731 A1 * | 11/2013 | Wright .................... C08L 21/00 524/505 |
| 2014/0324006 A1 | 10/2014 | Zhong |
| 2015/0284596 A1 | 10/2015 | Nakada et al. |
| 2016/0040440 A1 | 2/2016 | Wiercinski et al. |

FOREIGN PATENT DOCUMENTS

| | | | |
|---|---|---|---|
| CN | 102277112 | 12/2011 | |
| CN | 106281151 | 1/2017 | |
| EP | 2995665 A1 * | 3/2016 | ............... C09J 7/29 |
| EP | 3243886 | 11/2017 | |
| EP | 3409740 | 12/2018 | |
| WO | 2011/139466 | 11/2011 | |
| WO | 2012/061032 | 5/2012 | |
| WO | 2015/109160 | 7/2015 | |
| WO | 2015/195616 | 12/2015 | |
| WO | WO 2018/178781 | * 10/2018 | |

OTHER PUBLICATIONS

Translation of EP 2995665 (no date).*

(Continued)

*Primary Examiner* — Marc S Zimmer

(57) ABSTRACT

Provided herein is a hot melt pressure sensitive adhesive comprising one or more styrene block copolymers, a tackifier, and polyisobutylene plasticizer, wherein the adhesive contains less than 1 wt % of a plasticizer oil. The adhesive can be used in a label construction along with a facestock such as a polyethylene facestock, wherein the swelling factor of the facestock is reduced as compared to the swelling factor of the facestock in labels that include a plasticizer oil. Also provided are methods for producing and using the hot melt adhesive, and articles labeled with the hot melt adhesive.

28 Claims, No Drawings

(56) References Cited

OTHER PUBLICATIONS

Written Opinion of the International Preliminary Examining Authority dated Mar. 10, 2020 issued in corresponding IA No. PCT/US2019/029273 filed Apr. 26, 2019.
Applicant's Response to Written Opinion dated Oct. 17, 2019 submitted in corresponding IA No. PCT/US2019/029273 filed Apr. 26, 2019.
International Search Report and Written Opinion dated Aug. 8, 2019 issued in corresponding IA No. PCT/US2019/029273 filed Apr. 26, 2019.
International Preliminary Report on Patentability dated Jul. 15, 2020 issued in corresponding IA No. PCT/US2019/029273 filed Apr. 26, 2019.

\* cited by examiner

NON-SWELLING HOT MELT ADHESIVE

CROSS-REFERENCE TO RELATED APPLICATION

The present application is a 371 of International Application No. PCT/US2019/029273, which was published in English on Oct. 31, 2019, and claims the benefit of U.S. Provisional Patent Application No. 62/663,288 filed Apr. 27, 2018, both of which are incorporated herein by reference in their entireties.

FIELD

The present disclosure relates generally to hot melt pressure sensitive adhesives, in particular, hot melt pressure adhesives that exhibit improved plasticity and/or reduced substrate swelling.

BACKGROUND

Hot melt pressure sensitive adhesives can provide adhesiveness or tack to various types of substrates when applied at room temperature. This adhesiveness can provide for instantaneous adhesion to a substrate when pressurized.

Pressure sensitive adhesives are easy to handle in solid form, quickly form adhesive bonds without significant supplementary processing, and generally have a long shelf life. Pressure sensitive adhesives are also generally known to provide a convenient and economical way to label articles of commerce such as glass, metal, and plastic containers for consumer and industrial products. Pressure sensitive adhesives are widely used for the manufacture of self-adhesive labels, which are fastened to articles for the purpose of presenting information (such as a barcode, description, price) or decorative features.

Many conventional hot melt pressure sensitive adhesives are typically formulated with an oil based plasticizer to impart greater softness and flexibility to the adhesive. Exemplary oil-based plasticizers include natural or synthetic petroleum-based plasticizers. The plasticizers, however, can have undesired interactions with some types of materials commonly used with pressure sensitive adhesives. For example, certain plastic facestocks used in the construction of labels are prone to swelling when coated with an adhesive composition that includes such oil based plasticizers. This swelling can degrade both the appearance and the performance of the label.

In view of the limitations of conventional hot melt pressure sensitive adhesives discussed above, the need exists for adhesive formulations that have an improved ability to reduce the swelling of label facestocks while providing sufficient adhesive plasticity.

SUMMARY

Hot melt adhesives, such as hotmelt pressure sensitive adhesives, having an improved ability to reduce the swelling of label facestocks while providing sufficient adhesive plasticity are described herein. In some embodiments, the adhesive demonstrates a swelling factor of less than 1% as measured one (1) week after applying to a polyethylene facestock and a release liner. In one embodiment, the hot melt adhesives contain less than 1 wt % of a plasticizer oil. "Plasticizer oil" and "oil-based plasticizer", as used herein, refers to traditional plasticizer oils including, but not limited to, plasticizers refined from crude oil. Exemplary plasticizers refined from crude oil include, but are not limited to, naphthenic and paraffinic base oils, trimellitates and adipic polyesters, and phthalates.

In some embodiments, the adhesive contains one or more styrene block copolymers. Exemplary styrene block copolymers include, but are not limited to, styrene isoprene block copolymer, styrene butadiene block copolymer, or combinations thereof. In some embodiments, the one or more styrene block copolymers is selected from styrene isoprene block copolymer, styrene butadiene block copolymer, or combinations thereof. In some embodiments, the polystyrene content of the styrene block copolymers ranges from about 10% to about 25%. In some embodiments, the diblock content of the styrene block copolymers ranges from about 5% to about 90%. In some embodiments, the melt index of each of the styrene block copolymers ranges from about 10 g per 10 minute to about 35 g per 10 minute. In some embodiments, the concentration of the styrene block copolymers in the adhesive ranges from about 20 wt % to about 45 wt %.

The adhesive can further contain a tackifier. Exemplary tackifiers include one or more aromatic hydrocarbon resins, terpene phenolic resins, or combinations thereof. In some embodiments, the tackifier has a softening point ranging from about 80° C. to about 120° C. In some embodiments, the tackifier has a glass transition temperature ranging from about 30° C. to about 70° C. In some embodiments, the tackifier has a weight average molecular weight ranging from about 250 g/mol to about 2000 g/mol. In some embodiments, the concentration of the tackifier in the adhesive ranges from about 15 wt % to about 55 wt %.

The adhesive can further contain polyisobutylene. In some embodiments, the number average molecular weight of the polyisobutylene ranges from about 700 g/mol to about 2500 g/mol. In some embodiments, the concentration of polyisobutylene in the adhesive ranges from about 15 wt % to about 35 wt %. In some embodiments, the weight ratio of the polyisobutylene to the styrene block copolymers ranges from about 3.8 to about 8.3. In some embodiments, the weight ratio of the polyisobutylene to the tackifier ranges from about 1.3 to about 3.1.

In some embodiments, the adhesive consists essentially of, or consists of, one or more styrene block copolymers, one or more tackifiers, one or more polyisobutylenes, and optionally one or more plasticizer oils, as described above, in the amounts described above.

Methods for preparing the hotmelt adhesives described herein are also disclosed. In some embodiments, the method includes combining the one or more styrene block copolymers, the tackifier, and polyisobutylene to produce a hot melt adhesive having less than 1 wt % of a plasticizer oil.

Labels containing the adhesives described herein are also disclosed. In some embodiments, the label has a swelling factor of less than about 1% as measured 1 week after applying to a facestock and an optional release liner. In some embodiments, the label contains a facestock layer capable of receiving printed indicia. In some embodiments, the facestock is, or contains, polyethylene. In some embodiments, the thickness of the facestock layer ranges from about 0.5 mil to about 5 mil. The label further contains an adhesive layer comprising the holt melt adhesive described herein. In some embodiments, the label further contains a release liner.

Methods of applying the labels described herein to a surface, such as a surface of a substrate or article, are also disclosed. In some embodiments, the method contains providing a surface having an outer face. The method contains adhering the label to the outer face of the surface, thereby applying the label to the surface. Such labeled surfaces are also disclosed.

DETAILED DESCRIPTION

I. Definitions

The term "swelling factor" as used herein refers to a percentage increase in the machine direction length of a facestock after being coated with an adhesive.

II. Hot Melt Adhesives

Hot melt pressure sensitive adhesives that, when coated on a facestock, provide advantageous reductions in swelling of the facestock are described herein. For example, in a label assembly, it is beneficial for a facestock to have dimensions that do not change, e.g., swell, significantly once coated with an adhesive. Swelling may result from changes to the facestock length and can cause the resultant label to develop a less smooth appearance. The facestock variations may also reduce the integrity of label laminate layers. Facestock swelling can also result in sticky edges of label slit rolls or rippling of the label laminate on processing machines as tension on the laminate is released.

Conventional labels can suffer from issues associated with facestock swelling. The use of plasticizers in adhesives can provide the adhesives with desired elasticity and viscosity characteristics. Conventional hot melt pressure sensitive adhesives typically include one or more oils, such as mineral oil, to serve as an adhesive plasticizer. These oil plasticizers, however, can also promote the aforementioned undesired swelling of facestocks to which they have been applied. Without being bound by theory, it is suspected that the oils can penetrate a thin and flexible facestock film, such as a polyethylene plastic film, resulting in a swelling effect typically observed within 1-7 days after application. This swelling can create a rippled and irregular appearance in the facestock, and can also lead to delamination from, for example, an attached liner. Thus, reduction of swelling is highly desirable to improve the quality of the resultant labels.

The hot melt adhesive contains one or more styrene block copolymers, a tackifier, and polyisobutylene. In some embodiments, the hot melt adhesive advantageously contains low amounts of, e.g., is substantially fee of, traditional plasticizer oil(s). For example, the concentration of plasticizer oil in the hot melt adhesive formulation can be less than about 5 wt %, e.g., less than about 4 wt %, less than about 3 wt %, less than about 2 wt %, less than about 1 wt %, less than about 0.8 wt %, less than about 0.6 wt %, less than about 0.5 wt %, less than about 0.4 wt %, less than about 0.3 wt %, less than about 0.2 wt %, or less than about 0.1 wt %. In some embodiments, the plasticizer oil concentration in the adhesive ranges from 0 wt % to about 5 wt %, e.g., from 0 wt % to about 3 wt %, from about 0.5 wt % to about 3.5%, from about 1 wt % to about 4 wt %, from about 1.5 wt % to about 4.5 wt %, or from about 2 wt % to about 5 wt %. Surprisingly, because the pressure sensitive adhesives minimize or eliminate oil plasticizers, many of the undesired interactions with some types of materials commonly used with pressure sensitive adhesives, e.g., undesirable swelling, are avoided.

The hot melt adhesives can be used to produce labels having a reduced swelling factor. In some embodiments, the swelling factor of a facestock can be measured by comparing an initial length of a facestock material with a final length of the facestock as recorded one week after being coated with adhesive. After the one-week storage, the facestock film can be peeled away from an attached liner layer, and the final facestock length can be determined. When measured in this way, the hot melt adhesives can, for example, have a swelling factor that is less than about 5%, e.g., less than about 4%, less than about 3%, less than about 2%, less than about 1%, less than about 0.8%, less than about 0.6%, less than about 0.5%, less than about 0.4%, less than about 0.3%, less than about 0.2%, or less than about 0.1%.

It has been found that the use of polybutenes, such as polyisobutylenes, in place of oils as adhesive plasticizers provides for labels that demonstrate reduced facestock swelling. In particular, it has been found that adhesive formulations using low molecular weight polyisobutylenes as plasticizers exhibit lower swelling compared to adhesive formulations using conventional plasticizer oils. Importantly, these polyisobutylene plasticizers are still capable of advantageously reducing the modulus of an adhesive, while simultaneously decreasing the magnitude of facestock swelling when used in label constructions.

Moreover, the polyisobutylene plasticizers have been found to be highly compatible with other components of the adhesive. Without being bound by a particular theory, it is believed that the non-polar nature of polyisobutylene results in good miscibility with similar materials suitable for use in the disclosed adhesives. Miscibility can be characterized using the Hildebrand Solubility parameter. Compounds having like parameter values tend to be compatible, e.g., miscible, with one another. The Hildebrand parameter of polyisobutylene is 15.8 $MPa^{1/2}$, which is similar to those of, for example, polypropylene (16.2 $MPa^{1/2}$), polyisoprene (16.5 $MPa^{1/2}$), polyethylene (16.7 $MPa^{1/2}$), polybutadiene (17.0 $MPa^{1/2}$), polymethylacrylate (10.0 $MPa^{1/2}$), and polyethylene terephthalate (21.9 $MPa^{1/2}$). Another measure that can be used is the Hansen solubility parameter, with more compatible materials having parameter values with small differences from one another. The Hansen parameter of polyisobutylene is 7.8 $(cal/cm^3)^{1/2}$, which is similar to those of, for example, polyethylene (8.0 $(cal/cm^3)^{1/2}$), polyisoprene (8.2 $(cal/cm^3)^{1/2}$), polypropylene (9.3 $(cal/cm^3)^{1/2}$), polymethylacrylate (10.0 $(cal/cm^3)^{1/2}$), and polyethylene terephthalate (10.7 $(cal/cm^3)^{1/2}$).

In some embodiments, the adhesive composition does not contain a hydrophilic polymer. In some embodiments, the adhesive composition does not contain a hydrophilic composition selected from poly(N-vinyl lactams), poly(N-vinyl amides), poly(N-vinyl acrylamides), poly(N-alkylacrylamides), polyacrylic acids, polymethacrylic acids, polyvinyl alcohol, polyvinylamine, cellulose derivatives, polysaccharides, and copolymers and blends thereof.

In some embodiments, the adhesive composition does not contain a complementary polymer. The term "complementary polymer" as used herein means a polymer that forms hydrogen bonds to the hydrophilic polymer as described above. In some embodiments, the adhesive composition does not contain a complementary polymer selected from low molecular weight polyalkylene glycols, low molecular weight polyalcohols, monomeric and oligomeric alkylene glycols, ether alcohols, carbonic diacids, and alkane diols.

In some embodiments, the adhesive composition does not contain clay particles. In some embodiments, the adhesive composition does not contain clay particle materials selected from phyllosilicates (layered silicates) and layered double hydroxides (minerals and synthetic materials with positively charged brucite-type layers of mixed metal hydroxides). In some embodiments, the adhesive composition does not contain one or more phyllosilicates selected from allophane (hydrated aluminum silicate); apophyllite (hydrated potassium sodium calcium silicate hydroxide fluoride); bannisterite (hydrated potassium calcium manganese iron zinc aluminum silicate hydroxide); carletonite (hydrated potassium sodium calcium silicate carbonate hydroxide fluoride); cavansite (hydrated calcium vanadate silicate); chrysocolla (hydrated copper aluminum hydrogen silicate hydroxide); clay minerals (described in detail below); delhayelite (hydrated sodium potassium calcium aluminum silicate chloride fluoride sulfate); elpidite (hydrated sodium zirconium silicate); fedorite (hydrated potassium sodium calcium silicate hydroxide fluoride); franklinfurnaceite (calcium iron aluminum manganese zinc silicate hydroxide); franklinphilite (hydrated potassium manganese aluminum silicate); gonyerite (manganese magnesium iron silicate hydroxide); gyrolite (hydrated calcium silicate hydroxide); kanemite; kenyaite; leucosphenite (hydrated barium sodium titanium boro-silicate); magadiite; makatite; micas such as biotite (potassium iron magnesium aluminum silicate hydroxide fluoride), lepidolite (potassium lithium aluminum silicate hydroxide fluoride), muscovite (potassium aluminum silicate hydroxide fluoride), paragonite (sodium aluminum silicate hydroxide), phlogopite (potassium magnesium aluminum silicate hydroxide fluoride) and zinnwaldite (potassium lithium aluminum silicate hydroxide fluoride); minehillite (hydrated potassium sodium calcium zinc aluminum silicate hydroxide); nordite (cerium lanthanum strontium calcium sodium manganese zinc magnesium silicate); octosilicate; pentagonite (hydrated calcium vanadate silicate); petalite (lithium aluminum silicate); prehnite (calcium aluminum silicate hydroxide); rhodesite (hydrated calcium sodium potassium silicate); sanbomite (barium silicate); serpentines such as antigorite (magnesium iron silicate hydroxide), clinochrysotile (magnesium silicate hydroxide), lizardite (magnesium silicate hydroxide), orthochrysotile (magnesium silicate hydroxide) and serpentine (iron magnesium silicate hydroxide); wickenburgite (hydrated lead calcium aluminum silicate); and zeophyllite (hydrated calcium silicate hydroxide fluoride).

In some embodiments, the adhesive composition does not contain a hydrophilic polymer as described above, a complementary polymer as described above, clay particles as described above, and any combinations thereof.

In some embodiments, the adhesive composition does not contain a hydrolytic silane compound, alone or in combination with an aqueous buffer solution.

In some embodiments, the adhesive composition does not contain a water-soluble polymer, a water soluble or water-insoluble water-swellable polymer, or combinations thereof. In some embodiments, the adhesive composition does not contain a water-soluble polymer, a water soluble or water-insoluble water-swellable polymer, or combinations thereof selected from cross-linked sodium carboxymethyl cellulose, crystalline sodium carboxymethyl cellulose, cross-linked dextran, starch-acrylonitrile graft copolymers, "super absorbent" materials such as starch sodium polyacrylate, gluten, polymers of methyl vinyl ether and maleic acid and derivatives thereof, sodium carboxymethyl cellulose, pectin, gelatine, guar gum, locust bean gum, collagen, karaya gum and starch, particularly maize starch, and the like.

A. Polybutylenes

The hot melt adhesive can include one or more polybutene oligomers, one or more polybutylene polymers, or combinations thereof as plasticizers. In some embodiments, the plasticizer contains one or more polybutylene oligomers (e.g., less than 10 monomeric units). In some embodiments, the plasticizer contains one or more polyisobutylene polymers (e.g., greater than 10 monomeric units). The molecular weight of the polyisobutylene can be selected to provide the adhesive with improved softness properties. Without being bound by a particular theory, it is believed that the gem-dimethyl groups of the polyisobutylene polymer backbone contribute to the steric hindrance and limited mobility of the molecule. In this way, the polyisobutylene chemical structure can generate a high degree of entanglement within the adhesive composition, even when the molecular weight of the polyisobutylene polymer is relatively low.

The polyisobutylene of the hot melt adhesive formulation can, for example, have a number average molecular weight ranging from about 700 g/mol to about 2500 g/mol, e.g., from about 700 g/mol to about 1780 g/mol, from about 880 g/mol to about 1960 g/mol, from about 1060 g/mol to about 2140 g/mol, from about 1240 g/mol to about 2320 g/mol, or from about 1420 g/mol to about 2500 g/mol. In some embodiments, the polyisobutylene molecular weight can be less than about 2500 g/mol, e.g., less than about 2320 g/mol, less than about 2140 g/mol, less than about 1960 g/mol, less than about 1780 g/mol, less than about 1600 g/mol, less than about 1420 g/mol, less than about 1240 g/mol, less than about 1060 g/mol, or less than about 880 g/mol. In some embodiments, the polyisobutylene molecular weight can be greater than about 700 g/mol, e.g., greater than about 880 g/mol, greater than about 1060 g/mol, greater than about 1240 g/mol, greater than about 1420 g/mol, greater than about 1600 g/mol, greater than about 1960 g/mol, greater than about 2140 g/mol, or greater than about 2320 g/mol. In some embodiments, larger molecular weights, e.g., greater than about 2500 g/mol, and smaller molecular weights, e.g., less than about 700 g/mol are also contemplated.

The concentration of polyisobutylene in the hot melt adhesive can, for example, range from about 15 wt % to about 35 wt %, e.g., from about 15 wt % to about 27 wt %, from about 17 wt % to about 29 wt %, from about 19 wt % to about 31 wt %, from about 21 wt % to about 33 wt %, or from about 23 wt % to about 35 wt %. In some embodiments, the polyisobutylene concentration can be less than about 35 wt %, e.g., less than about 33 wt %, less than about 31 wt %, less than about 29 wt %, less than about 27 wt %, less than about 25 wt %, less than about 23 wt %, less than about 21 wt %, less than about 19 wt %, or less than about 17 wt %. In some embodiments, the polyisobutylene concentration can be greater than about 15 wt %, e.g., greater than about 17 wt %, greater than about 19 wt %, greater than about 21 wt %, greater than about 23 wt %, greater than about 25 wt %, greater than about 27 wt %, greater than about 29 wt %, greater than about 31 wt %, or greater than about 33 wt %. In some embodiments, e.g. less than about 15 wt %, and greater polyisobutylene concentrations, e.g., greater than about 35 wt %, are also contemplated. Commercial hydrocarbon polyisobutylenes suitable for use in the hot melt adhesive described herein include, but are not limited to, PB 24, available from Soltex (Houston, TX).

B. Styrene Block Copolymers

In some embodiments, the base polymer or copolymer of the hot melt adhesive formulation can be selected for good compatibility with the polyisobutylene plasticizer. Good compatibility between the base and the plasticizer can help to prevent phase separation within the adhesive, and a resulting undesired decrease in tack.

In certain aspects, the hot melt adhesive includes one or more styrene block copolymers having good compatibility with polyisobutylene as described above. The weight ratio of the polyisobutylene to the one or more styrene block copolymers in the hot melt adhesive can, for example, range from about 3:8 to about 8:3, i.e., from about 0.4 to about 2.7. For example, the weight ratio of the polyisobutylene to the styrene block copolymers can range from about 0.4 to about 1.2, from about 0.5 to about 1.5, from about 0.6 to about 1.8, from about 0.7 to about 2.2, or from about 0.8 to about 2.7. In some embodiments, the weight ratio of polyisobutylene to styrene block copolymers can be less than about 2.7, e.g., less than about 2.2, less than about 1.8, less than about 1.5, less than about 1.2, less than about 1, less than about 0.8, less than about 0.7, less than about 0.6, or less than about 0.5. In some embodiments, the weight ratio of polyisobutylene to styrene block copolymers can be greater than about 0.4, e.g., greater than about 0.5, greater than about 0.6, greater than about 0.7, greater than about 0.8, greater than about 1, greater than about 1.2, greater than about 1.5, greater than about 1.8, or greater than about 2.2. Larger ratios, e.g., greater than about 2.7, and smaller ratios, e.g., less than about 0.4, are also contemplated.

The one or more styrene block copolymers can include one or more styrene butadiene block copolymers. In some embodiments, the hot melt adhesive contains one styrene butadiene block copolymer. In some embodiments, the hot melt adhesive contains two different styrene butadiene block copolymers. In some embodiments, the hot melt adhesive contains three or more different styrene butadiene block copolymers. Commercial styrene butadiene block copolymers suitable for use in the hot melt adhesive include, but are not limited to, SOLPRENE® 1205, available from Dynasol (Houston, TX).

The one or more styrene block copolymers can include one or more styrene isoprene block copolymers. In some embodiments, the hot melt adhesive contains one styrene isoprene block copolymer. In some embodiments, the hot melt adhesive contains two different styrene isoprene block copolymers. In some embodiments, the hot melt adhesive contains three or more different styrene isoprene block copolymers. The styrene isoprene block copolymers can be linear triblock styrene isoprene styrene (SIS) copolymers. Commercial styrene isoprene block copolymers suitable for use in the hot melt adhesive include, but are not limited to, KRATON® D1161 and KRATON® D1119, each of which are available from Kraton (Houston, TX), and QUINTAC® 3433N, available from ZEON (Louisville, KY).

The one or more styrene block copolymers can each, independently, have a melt index ranging from about 10 g/(10 minute) to about 35 g/(10 minute), e.g., from about 10 g/(10 minute) to about 25 g/(10 minute), from about 12.5 g/(10 minute) to about 27.5 g/(10 minute), from about 15 g/(10 minute) to about 30 g/(10 minute), from about 17.5 g/(10 minute) to about 32.5 g/(10 minute), or from about 20 g/(10 minute) to about 35 g/(10 minute). In some embodiments, the styrene block copolymer melt indexes can be less than about 35 g/(10 minute), e.g., less than about 32.5 g/(10 minute), less than about 30 g/(10 minute), less than about 27.5 g/(10 minute), less than about 25 g/(10 minute), less than about 22.5 g/(10 minute), less than about 20 g/(10 minute), less than about 17.5 g/(10 minute), less than about 15 g/(10 minute), or less than about 12.5 g/(10 minute). In some embodiments, the styrene block copolymer melt indexes can be greater than about 10 g/(10 minute), e.g., greater than about 12.5 g/(10 minute), greater than about 15 g/(10 minute), greater than about 17.5 g/(10 minute), greater than about 20 g/(10 minute), greater than about 22.5 g/(10 minute), greater than about 25 g/(10 minute), greater than about 27.5 g/(10 minute), greater than about 30 g/(10 minute), or greater than about 32.5 g/(10 minute). In some embodiments, the melt indexes can be greater than about 35 g/(10 minute) or less than about 10 g/(10 minute). In some embodiments, each of the one of the more styrene block copolymers has a significantly different melt index, e.g., a melt index that is greater than 10% different from the melt indexes of the other styrene bock copolymers of the adhesive. In some embodiments, each of the one or more styrene block copolymers has a significantly similar melt index, e.g., a melt index that is less than 10% different from the melt indexes of the other styrene block copolymers of the adhesive.

The one or more styrene block copolymers of the hot melt adhesive can each, for example, independently have a diblock content ranging from about 5% to about 90%, e.g., from about 5% to about 56%, from about 13.5% to about 64.5%, from about 22% to about 73%, from about 30.5% to about 81.5%, or from about 39% to about 90%. In terms of upper limits, the styrene block copolymers can each independently have a diblock content less than about 90%, e.g., less than about 81.5%, less than about 73%, less than about 64.5%, less than about 56%, less than about 47.5%, less than about 39%, less than about 30.5%, less than about 22%, or less than about 13.5%. In terms of lower limits, the styrene block copolymer can each independently have a diblock content greater than about 5%, e.g., greater than about 13.5%, greater than about 22%, greater than about 30.5%, greater than about 39%, greater than about 47.5%, greater than about 56%, greater than about 64.5%, greater than about 73%, or greater than about 81.5%. Larger diblock contents, e.g., greater than about 90%, and smaller diblock contents, e.g., less than about 5%, are also contemplated. In some embodiments, each of the one of the more styrene block copolymers has a significantly different diblock content, e.g., a diblock content that is greater than about 10% different from the diblock contents of the other styrene bock copolymers of the adhesive. In some embodiments, each of the one or more styrene block copolymers has a significantly similar diblock content, e.g., a diblock content that is less than about 10% different from the diblock contents of the other styrene block copolymers of the adhesive.

The one or more styrene block copolymers of the hot melt adhesive can each, for example, independently have a polystyrene content ranging from about 10% to about 25%, e.g., from about 10% to about 19%, from about 11.5% to about 20.5%, from about 13% to about 22%, from about 14.5% to about 23.5%, or from about 16% to about 25%. In terms of upper limits, the styrene block copolymers can each independently have a polystyrene content less than about 25%, e.g., less than about 23.5%, less than about 22%, less than about 20.5%, less than about 19%, less than about 17.5%, less than about 16%, less than about 14.5%, less than about 13%, or less than about 11.5%. In terms of lower limits, the styrene block copolymer can each independently have a polystyrene content greater than about 10%, e.g., greater than about 11.5%, greater than about 13%, greater than about 14.5%, greater than about 16%, greater than about 17.5%, greater than about 19%, greater than about 20.5%, greater than about 22%, or greater than about 23.5%. Larger polystyrene contents, e.g., greater than about 25%, and smaller polystyrene contents, e.g., less than about 10%, are also contemplated. In some embodiments, each of the one of the more styrene block copolymers has a significantly different polystyrene content, e.g., a polystyrene content that is greater than about 10% different from the polystyrene contents of the other styrene bock copolymers of the adhesive. In some embodiments, each of the one or more styrene block copolymers has a significantly similar polystyrene content, e.g., a polystyrene content that is less than about 10% different from the polystyrene contents of the other styrene block copolymers of the adhesive.

The combined concentration of the one or more styrene block copolymers in the hot melt adhesive can, for example, range from about 20 wt % to about 45 wt %, e.g., from about 20 wt % to about 35 wt %, from about 22.5 wt % to about 37.5 wt %, from about 25 wt % to about 40 wt %, from about 27.5 wt % to about 42.5 wt %, or about 30 wt % to about 45 wt %. In terms of upper limits, the styrene block copolymer concentration can be less than about 45 wt %, e.g., less than about 42.5 wt %, less than about 40 wt %, less than about 37.5 wt %, less than about 35 wt %, less than about 32.5 wt %, less than about 30 wt %, less than about 27.5 wt %, less than about 25 wt %, or less than about 22.5 wt %. In terms of lower limits, the styrene block copolymer concentration can be greater than about 20 wt %, e.g., greater than about 22.5 wt %, greater than about 25 wt %, greater than about 27.5 wt %, greater than about 30 wt %, greater than about 32.5 wt %, greater than about 35 wt %, greater than about 37.5 wt %, greater than about 40 wt %, or greater than about 42.5 wt %. Larger concentrations, e.g., greater than about 45 wt %, and smaller concentrations, e.g., less than about 20 wt %, are also contemplated.

C. Tackifier

The tackifier of the hot melt adhesive formulation can be selected for good compatibility with the polyisobutylene plasticizer and/or styrene block copolymer as described above. Such compatibility between the tackifier and the plasticizer can help to prevent phase separation within the adhesive, and a resulting undesired decrease in tack. The weight ratio of the polyisobutylene to the tackifier in the hot melt adhesive can, for example, range from about 1:3 to about 3:1, i.e., from about 0.3 to about 3. For example, the weight ratio of the polyisobutylene to the tackifier can range from about 0.3 to about 1.2, from about 0.4 to about 1.6, from about 0.5 to about 1.9, from about 0.6 to about 2.4, or from about 0.8 to about 3. In terms of upper limits, the weight ratio of polyisobutylene to tackifier can be less than about 3, e.g., less than about 2.4, less than about 1.9, less than about 1.6, less than about 1.2, less than about 1, less than about 0.8, less than about 0.6, less than about 0.5, or less than about 0.4. In terms of lower limits, the weight ratio of polyisobutylene to tackifier can be greater than about 0.3, e.g., greater than about 0.4, greater than about 0.5, greater than about 0.6, greater than about 0.8, greater than about 1, greater than about 1.2, greater than about 1.6, greater than about 1.9, or greater than about 2.4. Larger ratios, e.g., greater than about 3, and smaller ratios, e.g., less than about 0.3, are also contemplated.

In some embodiments, the tackifier contains an aromatic hydrocarbon resin. Commercial hydrocarbon resin tackifiers suitable for use in the hot melt adhesive of the present disclosure include, but are not limited to, WINGTACK® EXTRA and WINGTACK® STS, each available from Cray Valley (Exton, PA). In some embodiments, the tackifier contains a terpene phenolic resin. Commercial phenolic resin tackifiers suitable for use in the hot melt adhesive of the present disclosure include, but are not limited to, DERTOPHENE T 105, available from DRT (France).

The softening point of the tackifier can, for example, range from about 80° C. to about 120° C., e.g., from about 80° C. to about 104° C., from about 84° C. to about 108° C., from about 88° C. to about 112° C., from about 92° C. to about 116° C., or from about 96° C. to about 120° C. In terms of upper limits, the tackifier softening point can be less than about 120° C., e.g., less than about 116° C., less than about 112° C., less than about 108° C., less than about 104° C., less than about 100° C., less than about 96° C., less than about 92° C., less than about 88° C., or less than about 84° C. In terms of lower limits, the tackifier softening point can be greater than about 80° C., e.g., greater than about 84° C., greater than about 88° C., greater than about 92° C., greater than about 96° C., greater than about 100° C., greater than about 104° C., greater than about 108° C., greater than about 112° C., or greater than about 116° C. Larger softening point temperatures, e.g., greater than about 120° C., and smaller softening point temperatures, e.g., less than about 80° C., are also contemplated.

The glass transition temperature of the tackifier can, for example, range from about 30° C. to about 70° C., e.g., from about 30° C. to about 54° C., from about 34° C. to about 58° C., from about 38° C. to about 62° C., from about 42° C. to about 66° C., or from about 46° C. to about 70° C. In terms of upper limits, the tackifier glass transition temperature can be less than about 70° C., e.g., less than about 66° C., less than about 62° C., less than about 58° C., less than about 54° C., less than about 50° C., less than about 46° C., less than about 42° C., less than about 38° C., or less than about 34° C. In terms of lower limits, the tackifier glass transition temperature can be greater than about 30° C., e.g., greater than about 34° C., greater than about 38° C., greater than about 42° C., greater than about 46° C., greater than about 50° C., greater than about 54° C., greater than about 58° C., greater than about 62° C., or greater than about 66° C. Larger glass transition temperatures, e.g., greater than about 70° C., and smaller glass transition temperatures, e.g., less than about 30° C., are also contemplated.

The weight average molecular weight of the tackifier can, for example, range from about 250 g/mol to about 2000 g/mol, e.g., from about 250 g/mol to about 1300 g/mol, from about 425 g/mol to about 1475 g/mol, from about 600 g/mol to about 1650 g/mol, from about 775 g/mol to about 1825 g/mol, or from about 950 g/mol to about 2000 g/mol. In terms of upper limits, the tackifier weight average molecular weight can be less than about 2000 g/mol, e.g., less than about 1825 g/mol, less than about 1650 g/mol, less than about 1475 g/mol, less than about 1300 g/mol, less than about 1125 g/mol, less than about 950 g/mol, less than about 775 g/mol, less than about 600 g/mol, or less than about 425 g/mol. In terms of lower limits, the tackifier molecular weight can be greater than about 250 g/mol, e.g., greater than about 425 g/mol, greater than about 600 g/mol, greater than about 775 g/mol, greater than about 950 g/mol, greater than about 1125 g/mol, greater than about 1300 g/mol, greater than about 1475 g/mol, greater than about 1650 g/mol, or greater than about 1825 g/mol. Larger molecular weights, e.g., greater than about 2000 g/mol, and smaller molecular weights, e.g., less than about 250 g/mol, are also contemplated.

The concentration of the tackifier in the hot melt adhesive can, for example, range from about 15 wt % to about 55 wt %, e.g. from about 15 wt % to about 39 wt %, from about 19 wt % to about 43 wt %, from about 23 wt % to about 47 wt %, from about 27 wt % to about 51 wt %, or from about 31 wt % to about 55 wt %. In terms of upper limits, the tackifier concentration can be less than about 55 wt %, e.g., less than about 51 wt %, less than about 47 wt %, less than about 43 wt %, less than about 39 wt %, less than about 35 wt %, less than about 31 wt %, less than about 27 wt %, less than about 23 wt %, or less than about 19 wt %. In terms of lower limits, the tackifier concentration can be greater than about 15 wt %, e.g., greater than about 19 wt %, greater than about 23 wt %, greater than about 27 wt %, greater than about 31 wt %, greater than about 35 wt %, greater than about 39 wt %, greater than about 43 wt %, greater than about 47 wt %, or greater than about 51 wt %. Larger concentrations, e.g., greater than about 55 wt %, and smaller concentrations, e.g., less than about 15 wt %, are also contemplated.

D. Additives

The hot melt pressure sensitive adhesives can also include one or more fillers. The one or more fillers can include inorganic fillers such as carbon black, silica (hydrophilic and hydrophobic modified), mica, talc, kaolin and the like. In some embodiments, the filler contains calcium carbonate. Commercial calcium carbonate fillers suitable for use in the present disclosure include, but are not limited to, OMYAC-ARB®, available from Omya (Cincinnati, OH). Inorganic fillers including the foregoing examples can be used to modulate the physical properties of the adhesive.

The concentration of filler in the hot melt adhesive can, for example, range from about 5 wt % to about 15 wt %, e.g., from about 5 wt % to about 11 wt %, from about 6 wt % to about 12 wt %, from about 7 wt % to about 13 wt %, from about 8 wt % to about 14 wt %, or from about 9 wt % to about 15 wt %. In terms of upper limits, the filler concentration can be less than about 15 wt %, e.g., less than about 14 wt %, less than about 13 wt %, less than about 12 wt %, less than about 11 wt %, less than about 10 wt %, less than about 9 wt %, less than about 8 wt %, less than about 7 wt %, or less than about 6 wt %. In terms of lower limits, the filler concentration can be greater than about 5 wt %, e.g., greater than about 6 wt %, greater than about 7 wt %, greater than about 8 wt %, greater than about 9 wt %, greater than about 10 wt %, greater than about 11 wt %, greater than about 12 wt %, greater than about 13 wt %, or greater than about 14 wt %. Larger concentrations, e.g., greater than about 15 wt %, and smaller concentrations, e.g., less than about 5 wt %, are also contemplated.

The hot melt pressure sensitive adhesives can also include one or more antioxidants. Antioxidants include, but are not limited to, hindered phenols, amines, and sulfur and phosphorus hydroxide decomposers. In some embodiments, the antioxidant is a phenolic antioxidant. Commercial phenolic antioxidants suitable for use in the hot melt adhesive of the present disclosure include, but are not limited to, BNX® 1225, available from Mayzo (Suwanee, GA).

The concentration of antioxidant in the hot melt adhesive can, for example, range from about 0.5 wt % to about 1.5 wt %, e.g., from about 0.5 wt % to about 1.1 wt %, from about 0.6 wt % to about 1.2 wt %, from about 0.7 wt % to about 1.3 wt %, from about 0.8 wt % to about 1.4 wt %, or from about 0.9 wt % to about 1.5 wt %. In terms of upper limits, the antioxidant concentration can be less than about 1.5 wt %, e.g., less than about 1.4 wt %, less than about 1.3 wt %, less than about 1.2 wt %, less than about 1.1 wt %, less than about 1 wt %, less than about 0.9 wt %, less than about 0.8 wt %, less than about 0.7 wt %, or less than about 0.6 wt %. In terms of lower limits, the antioxidant concentration can be greater than about 0.5 wt %, e.g., greater than about 0.6 wt %, greater than about 0.7 wt %, greater than about 0.8 wt %, greater than about 0.9 wt %, greater than about 1 wt %, greater than about 1.1 wt %, greater than about 1.2 wt %, greater than about 1.3 wt %, or greater than about 1.4 wt %. Larger concentrations, e.g., greater than about 1.5 wt, and smaller concentrations, e.g., less than about 0.5 wt %, are also contemplated.

Other additives can be added to the hot melt pressure sensitive adhesive to obtain a certain desired characteristic. These additives can include, for example, pigments, waxes, surfactants, talc, powdered silicates, defoamers, colorants, UV stabilizers or absorbers, luminescents, crosslinkers, foam control agents, buffer agents, anti-blocking agents, wetting agents, matting agents, antistatic agents, acid scavengers, flame retardants, processing aids or agents, extrusion aids, thermally or electrically conductive agents, and others.

III. Labels

Labels that include the hot melt adhesive described herein are also disclosed. The labels can include a facestock layer capable of receiving printed indicia, and a layer of hot melt adhesive having a composition as described above. The labels can also include one or more additional facestock layers, one or more additional adhesive layers, and one or more optional print layers. The present subject matter can be utilized in labels free of print, but in many embodiments, the labels contain one or more regions of print.

The facestock layer and adhesive layer can be positioned directly adjacent to one another or can have one or more additional layers in between them. Additional layers can include, for example, one or more coating layers, support layers, print layers, reflective layers, laminate layers, or others. Any one or more of the layers can also include two or more sublayers, each with different compositions, configurations, and functions.

In some embodiments, the label further includes print disposed on the layer of facestock. The print can include layers or regions of ink, dyes, pigments, colorants, or like materials. Although the present subject matter is largely directed toward labels including visually perceptible print, it is contemplated that the labels may include print that is exclusively or primarily indicative under UV light or other conditions or stimuli.

The adhesive layer can be applied directly adjacent to, and in contact with, the facestock. There can be intervening layers between the adhesive layer and the facestock. The label can include two or more layers of adhesive and/or facestock. The adhesive layer of the label can be coated onto the facestock with a coat weight of, for example, from about 5 gsm to about 60 gsm, e.g., from about 5 gsm to about 38 gsm, from about 10.5 gsm to about 43.5 gsm, from about 16 gsm to about 49 gsm, from about 21.5 gsm to about 54.5 gsm, or from about 27 gsm to about 60 gsm. In terms of upper limits, the adhesive layer of the label can have a coat weight that is less than about 60 gsm, e.g., less than about 54.5 gsm, less than about 49 gsm, less than about 43.5 gsm, less than about 38 gsm, less than about 32.5 gsm, less than about 27 gsm, less than about 21.5 gsm, less than about 16 gsm, or less than about 10.5 gsm. In terms of lower limits, the adhesive layer of the label can have a coat weight that is greater than about 5 gsm, e.g., greater than about 10.5 gsm, greater than about 16 gsm, greater than about 21.5 gsm, greater than about 27 gsm, greater than about 32.5 gsm, greater than about 38 gsm, greater than about 43.5 gsm, greater than about 49 gsm, or greater than about 54.5 gsm. Lower adhesive layer coat weights, e.g., coat weights less than about 5 gsm, and higher adhesive layer coat weights, e.g., coat weights greater than about 60 gsm, are also contemplated.

One or more clear or transparent layers, metallic layers, or combinations thereof can be incorporated into any of the label constructions described herein.

In certain embodiments, the facestock contains one or more papers, one or more polymers, one or more metals, one or more woods, or combinations thereof. The facestock can include, for example, paper facestock, cardboard facestock, plastic facestock, a multilayer laminated facestock including both paper and plastic layers, or any other materials that are commonly used in the industry. The multilayer laminate facestock can include a paper layer overlying a plastic layer. The plastic layer of the multilayer laminate facestock can be extruded or otherwise coated onto the paper layer.

The paper layer can include, for example, high gloss paper, semi-gloss paper, lithographic paper, or electronic data processing (EDP) paper; and can be configured for use in, for example, multi-color printing, typewriter printing, or inkjet printing.

The plastic layer can include, for example, polyesters, such as polyethylene terephthalate (PET); polyolefins, such as polypropylene (PP), ethylene-propylene copolymers, polyethylene (PE); and other materials. Other polymeric film materials include urethane based polymers such as polyether urethane and polyester urethane; amide based polymers including polyether polyamide copolymers; acrylic based polymers including a polyacrylate, and ethylene/vinyl acetate copolymer; polyester based polymers including a polyether polyester; a vinyl chloride; a vinylidene chloride; a polystyrene; a polyacrylonitrile; a polycarbonate; a polyimide; or the like. The facestock can include a flexible facestock. The facestock can include a transparent polymeric film. The hot melt pressure sensitive adhesives can be particularly effective in limiting the swelling of labels made of thin and flexible facestock films. In some embodiments, the facestock layer contains polyethylene.

The thickness of the facestock layer can, for example, range from about 0.5 mil to about 5 mil, e.g., from about 0.5 mil to about 3.2 mil, from about 0.95 mil to about 3.65 mil, from about 1.4 mil to about 4.1 mil, from about 1.85 mil to about 4.55 mil, or from about 2.3 mil to about 5 mil. In terms of upper limits, the facestock layer thickness can be less than about 5 mil, e.g., less than about 4.55 mil, less than about 4.1 mil, less than about 3.65 mil, less than about 3.2 mil, less than about 2.75 mil, less than about 2.3 mil, less than about 1.85 mil, less than about 1.4 mil, or less than about 0.95 mil. In terms of lower limits, the facestock layer thickness can be greater than about 0.5 mil, greater than about 0.95 mil, greater than about 1.4 mil, greater than about 1.85 mil, greater than about 2.3 mil, greater than about 2.75 mil, greater than about 3.2 mil, greater than about 3.65 mil, greater than about 4.1 mil, or greater than about 4.55 mil. Larger thicknesses, e.g., greater than about 5 mil, and smaller thicknesses, e.g., less than about 0.5 mil, are also contemplated.

In some embodiments, a release liner is connected to the adhesive layer opposite the facestock. The releasable liner can function as a protective cover such that the release liner remains in place until the label is ready for attachment to an object or surface. If a liner or release liner is included in the label, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the outer adhesive layer. Prior to application of the label to a surface of interest, the liner is removed to thereby expose the adhesive face of the label. The liner can be in the form of a single sheet. Alternatively, the liner can be in the form of multiple sections or panels.

IV. Methods

Also provided are methods of producing a hot melt pressure sensitive adhesive. The method can include providing one or more styrene block copolymers, a tackifier, and polyisobutylene. The method can further include combining the one or more styrene block copolymers, the tackifier, and the polyisobutylene to produce the hot melt adhesive. The concentrations and other characteristics of the one or more styrene block copolymers, tackifier, and polyisobutylene can be as described above. In some embodiments, the produced hot melt adhesive includes from about 10 wt % to about 40% of a styrene isoprene block copolymer, from about 0 wt % to about 20 wt % of a styrene butadiene block copolymer, from about 20 wt % to about 45 wt % of a tackifier, and from about 15 wt % to about 35 wt % polyisobutylene. In some embodiments, the method further contains providing a filler, and combining the filler with the other adhesive ingredients to produce the hot melt adhesive. The concentration and other characteristics of the filler can be as described above. In some embodiments, the produced hot melt adhesive includes from about 0 wt % to about 15 wt % calcium carbonate filler. In some embodiments, the method further contains providing an antioxidant, and combining the antioxidant with the other adhesive ingredients to produce the hot melt adhesive. The concentration and other characteristics of the antioxidant can be as described above. In some embodiments, the produced hot melt adhesive includes from about 0 wt % to about 2 wt % of a phenolic antioxidant.

Also provided are methods of making a label. The methods can include producing a hot melt adhesive using any of the methods as described above. The methods can further include coating the hot melt adhesive on a facestock capable of receiving printed indicia. The facestock of the label can be as described above. The coating operation can include, for example, slot die coating or curtain die coating. The adhesive can also be coated onto a facestock using techniques such as spraying, wire coating, knife coating, Meyer Bar coating, extrusion coating, gravure print coating, or other coating process known to one of skill in the art.

The coating can generate an adhesive layer having, for example, a coat weight from about 5 gsm to about 60 gsm, e.g., from about 5 gsm to about 38 gsm, from about 10.5 gsm to about 43.5 gsm, from about 16 gsm to about 49 gsm, from about 21.5 gsm to about 54.5 gsm, or from about 27 gsm to about 60 gsm. In terms of upper limits, the adhesive layer coat weight can be less than about 60 gsm, e.g., less than about 54.5 gsm, less than about 49 gsm, less than about 43.5 gsm, less than about 38 gsm, less than about 32.5 gsm, less than about 27 gsm, less than about 21.5 gsm, less than about 16 gsm, or less than about 10.5 gsm. In terms of lower limits, the adhesive layer coat weight can be greater than about 5 gsm, e.g., greater than about 10.5 gsm, greater than about 16 gsm, greater than about 21.5 gsm, greater than about 27 gsm, greater than about 32.5 gsm, greater than about 38 gsm, greater than about 43.5 gsm, greater than about 49 gsm, or greater than about 54.5 gsm. Lower adhesive layer coat weights, e.g., coat weights less than about 5 gsm, and higher coat weights, e.g., coat weights greater than about 60 gsm, are also contemplated.

Also provided are methods of applying a label to a surface. The methods can include providing a surface having an outer face. The surface can include, for example, one or more papers, one or more polymers, one or more metals, glass, one or more woods, or combinations thereof. The methods can further include providing a label as described above. The methods can further include adhering the activated label to the outer face of the surface, thereby applying the label to the surface.

The following embodiments are contemplated. All combinations of features and embodiment are contemplated.

Embodiment 17

The present disclosure will be better understood in view of the following non-limiting examples.

EXAMPLES

Three hot melt adhesives compositions were prepared according to the formulations listed below in Table 1.

TABLE 1

Non-Swelling Adhesive Formulations

|  | Ex. 1 (%) | Ex. 2 (%) | Ex. 3 (%) | Ex. 4 (%) | Ex. 5 (%) | Ex. 6 (%) |
| --- | --- | --- | --- | --- | --- | --- |
| KRATON ® D1161 | 21.8 | 27.6 | — | 18.4 | 21.2 | — |
| KRATON ® D1119 | — | — | 10.0 | — | — | — |
| QUINTAC ® 3433N | — | — | — | — | — | 31.3 |
| SOLPRENE ® 1205 | 7.6 | — | 17.7 | 12.2 | 6.4 | — |
| SYLVALITE ™ RE 100L | 35.2 | — | — | — | — | — |
| WINGTACK ® STS | — | 41.5 | — | 29.1 | — | — |
| DERTOPHENE T 105 | — | — | 39.6 | — | 36.8 | 26.7 |
| PB 24 | 27.8 | 24.9 | 24.9 | 21.6 | 27.6 | 27.0 |
| OMYACARB ® 3-FL | 7.3 | 6.9 | 6.9 | 7.1 | 7.3 | 6.9 |
| BNX ® 1225 | 0.9 | 0.9 | 0.9 | 0.8 | 0.8 | 0.9 |
| PIB/SBC ratio | 0.946 | 0.902 | 0.899 | 0.720 | 1.00 | 0.863 |
| PIB/TAC ratio | 0.790 | 0.600 | 0.629 | 0.742 | 0.750 | 1.01 |
| SBC/TAC ratio | 0.835 | 0.665 | 0.699 | 1.05 | 0.750 | 1.17 |

PIB = polyisobutylene,
SBC = styrene block copolymer,
TAC = tackifier

Three of the adhesives of Table 1, and two comparative adhesive formulations, were each coated directly onto a polyethylene facestock. Comparative adhesive A of Table 2 is 14708-122B, available from Henkel (Madison Heights, MI), and comparative adhesive B of Table 2 is 10192-42, available from H. B. Fuller (St. Paul, MN). The lengths of each coated facestock sample were measured before and after one week of storage. The ratios of the initial and final lengths thus measured were used to calculate the swelling factor values shown in Table 2 below. These results demonstrate that the disclosed hot melt adhesives with polyisobutylene plasticizer are capable of creating labels with reduced swelling, as compared to labels created using some conventional adhesives with oil plasticizers.

TABLE 2

Non-Swelling Adhesive Performances

|  | Ex. 1 | Ex. 2 | Ex. 3 | Comp. A | Comp. B |
| --- | --- | --- | --- | --- | --- |
| Initial facestock length (cm) | 11.53 | 14.73 | 12.16 | 9.99 | 9.07 |
| Final facestock length (cm) | 11.57 | 14.79 | 12.20 | 10.12 | 9.22 |
| Swelling factor (%) | 0.35 | 0.41 | 0.33 | 1.30 | 1.65 |

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. A hot melt adhesive comprising:
one or more styrene block copolymers;
a tackifier;
a polyisobutylene; and
a plasticizer oil,
wherein the number average molecular weight of the polyisobutylene ranges from 700 g/mol to 2500 g/mol, and
wherein the adhesive is a pressure sensitive adhesive;
wherein the one or more styrene block copolymers is selected from the group consisting of a styrene isoprene block copolymer, styrene butadiene block copolymer, or combinations thereof; and
the melt index of each of the styrene block copolymers ranges from about 10 g/(10 minute) to about 35 g/(10 minute) measured at 200° C. under pressure of 5 kg weight; and
wherein at least one of the one or more styrene block copolymers is a styrene butadiene block copolymer.

2. The hotmelt adhesive of claim 1, wherein the weight ratio of the polyisobutylene to the one or more styrene block copolymers ranges from 3:8 to 8:3.

3. The hotmelt adhesive of claim 1, wherein the weight ratio of the polyisobutylene to the tackifier ranges from 1:3 to 3:1.

4. The hot melt adhesive of claim 1, comprising from 20 wt % to 45 wt % of the one or more styrene block copolymers.

5. The hot melt adhesive of claim 1, wherein at least one of the one or more styrene block copolymers is a styrene isoprene block copolymer.

6. The hot melt adhesive of claim 5, wherein the diblock content of each of the at least one styrene isoprene block copolymer ranges from 5% to 90%.

7. The hot melt adhesive of claim 1, wherein at least one of the one or more styrene block copolymers is a styrene butadiene block copolymer.

8. The hot melt adhesive of claim 1, wherein the polystyrene content of each of the one or more styrene block copolymer ranges from 10% to 25%.

9. The hot melt adhesive of claim 1, wherein the tackifier is an aromatic hydrocarbon resin.

10. The hot melt adhesive of claim 1, wherein the tackifier is a terpene phenolic resin.

11. The hot melt adhesive of claim 1, wherein the softening point of the tackifier ranges from 80° C. to 120° C.

12. The hot melt adhesive of claim 1, wherein the glass transition temperature of the tackifier ranges from 30° C. to 70° C.

13. The hot melt adhesive of claim 1, wherein the weight average molecular weight of the tackifier ranges from 250 g/mol to 2000 g/mol.

14. The hot melt adhesive of any of claim 1, further comprising:
    from 5 wt % to 15 wt % of a filler.

15. The hot melt adhesive of claim 1, wherein the hot melt adhesive demonstrates a swelling factor of less than 1% as measured 1 week after applying to a polyethylene facestock and a release liner.

16. A method of preparing a hot melt adhesive, the method comprising:
    providing one or more styrene block copolymers, a tackifier, a polyisobutylene and a plasticizer oil;
    combining the one or more styrene block copolymers, the tackifier, the polyisobutylene and the plasticizer oil,
    wherein the number average molecular weight of the polyisobutylene ranges from 700 g/mol to 2500 g/mol,
    wherein the adhesive is a pressure sensitive adhesive,
    wherein the one or more styrene block copolymers is selected from the group consisting of a styrene isoprene block copolymer, styrene butadiene block copolymer, or combinations thereof; and
    the melt index of each of the styrene block copolymers ranges from about 10 g/(10 minute) to about 35 g/(10 minute) measured at 200° C. under pressure of 5 kg weight; and
    wherein at least one of the one or more styrene block copolymers is a styrene butadiene block copolymer.

17. A label comprising:
    a facestock layer capable of receiving printed indicia; and
    an adhesive layer comprising the hot melt adhesive of claim 1.

18. The label of claim 17, wherein the thickness of the facestock layer ranges from 0.5 mil to 5 mil.

19. The label of any of claim 17, further comprising: a release liner.

20. The label of claim 19, wherein the facestock layer comprises polyethylene.

21. The label of claim 20, wherein the label has a swelling factor of less than 1% as measured 1 week after applying to the polyethylene facestock and the release liner.

22. A method of applying a label to a surface, the method comprising:
    providing a surface having an outer face;
    providing a label of claim 17; and
    adhering the label to the outer face of the surface, thereby applying the label to the surface.

23. A labeled surface comprising:
    a surface having an outer face; and
    a label of claim 17 adhered to the outer face of the surface.

24. The hot melt adhesive of claim 1 consisting of:
    the one or more styrene block copolymers;
    the tackifier;
    the polyisobutylene; and
    0 wt % to 5 wt % of the plasticizer oil,
    one or more fillers,
    and one or more antioxidants.

25. The hotmelt adhesive of claim 1, comprising from 15 wt % to 35 wt % polyisobutylene.

26. The hot melt adhesive of claim 1, comprising from 15 wt % to 55 wt % tackifier.

27. The hot melt adhesive of claim 14, wherein the filler comprises calcium carbonate.

28. The hot melt adhesive of claim 1, further comprising: from 0.5 wt % to 1.5 wt % of a phenolic antioxidant.

* * * * *